(12) United States Patent
Folkerts et al.

(10) Patent No.: US 8,191,532 B2
(45) Date of Patent: *Jun. 5, 2012

(54) METHOD AND SYSTEM FOR DETECTING AND REDUCING ENGINE AUTO-IGNITION

(75) Inventors: Charles H. Folkerts, Troy, MI (US); Jose C Zavala Jurado, Ann Arbor, MI (US); Karl T. Kiebel, Royal Oak, MI (US); Johnson Wu, Sterling Heights, MI (US)

(73) Assignee: GM Global Technology Operations LLC

( * ) Notice: Subject to any disclaimer, the term of this patent is extended or adjusted under 35 U.S.C. 154(b) by 432 days.

This patent is subject to a terminal disclaimer.

(21) Appl. No.: 12/412,729

(22) Filed: Mar. 27, 2009

(65) Prior Publication Data

US 2010/0242912 A1   Sep. 30, 2010

(51) Int. Cl.
*F02P 5/00* (2006.01)
(52) U.S. Cl. ......... 123/406.11; 123/406.26; 123/406.28; 123/406.22

(58) Field of Classification Search ............. 123/406.11, 123/406.12, 406.17, 406.18, 406.22, 406.26–406.29
See application file for complete search history.

(56) References Cited

U.S. PATENT DOCUMENTS

| 7,290,442 B2 * | 11/2007 | Zhu et al. | ........... 73/114.67 |
| 7,318,411 B1 * | 1/2008 | Zhu et al. | ........... 123/406.26 |
| 2006/0042355 A1 * | 3/2006 | Zhu et al. | ........... 73/35.08 |

FOREIGN PATENT DOCUMENTS

| CN | 1682025 A | 10/2005 |
| CN | 1693690 A | 11/2005 |
| CN | 101265843 | 9/2008 |
| EP | 2009268 A1 | 12/2008 |

* cited by examiner

*Primary Examiner* — John Kwon

(57) ABSTRACT

A method and a control module for performing the same include a filter module filtering in-cylinder pressure signals using a filter to form filtered in-cylinder pressure signals. The control module further includes a heat release rate determination module generating heat release rate signals based on the in-cylinder pressure signals and a maximum heat rate determination module determining a maximum heat release rate from the heat release rate signals. The system also includes a correction module correcting auto-ignition for the engine based on the maximum heat release rate.

19 Claims, 4 Drawing Sheets

METHOD AND SYSTEM FOR DETECTING AND REDUCING ENGINE AUTO-IGNITION

FIELD

The present disclosure relates generally to a method and system for detecting auto-ignition and knock for an engine, and, more specifically to a method and system for reducing auto-ignition or spark knock for an engine.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Knock is the audible sound produced by intense combustion. Repeated knocking events will result in elevated surface temperatures and surface vibration of the combustion chamber and destructive removal of metal from the piston, cylinder head, valves, spark plug, and cylinder walls.

Although, auto-ignition and detonation have very specific definitions. These terms are used to describe a rapid heat release process of the end gases in the combustion chamber, which is the result of a rapid pressure rise that causes the end gases in the chamber to self ignite (auto-ignite) spontaneously throughout their volume resulting in an explosive combustion or detonation. A rapid pressure rise in the end gases is caused by a pressure wave that is traveling faster than the flame front, which results in the compression of the end gases and a rise in the end gas temperature that is sufficient to result in a spontaneous combustion or detonation of the entire volume of end gases. This results in an instantaneous release of heat that causes the cylinder pressure to resonate at the natural acoustical frequencies of the chamber. The sustained oscillations of the pressure waves cause the metal surfaces of the chamber to vibrate and produce the audible sound of knock. Thus, knock is the impulse response of the chamber in response to the rapid pressure rise or heat release that acts as an impulse to trigger the resonances of the combustion chamber. It is the equivalent of hitting the chamber with a hammer to provide an impulse to excite the natural resonant frequencies of the structure of the combustion chamber.

Hence, the rapid heat release and auto-ignition causes an audible effect, which is the knock (i.e. the rapid heat release and auto-ignition are the cause and the knock is the effect). The focus of knock control systems used in production has been to use the pressure oscillations as sensed through an accelerometer that measures the vibrations transmitted to the block structure as a result of the oscillating pressure wave in the combustion chamber. The energy of the oscillations in the block vibrations is used as an index of the intensity of the knock. The knock intensity can be detected by several approaches, such as the integral of the square of the oscillation waveform or the maximum peak-to-peak value of the oscillations. Then, this knock intensity signal is used to retard the spark to the point that the knock disappears. It takes significant cylinder pressure oscillations to be transmitted through the structure of the block and to be detected by the vibration sensor (accelerometer). Thus, the engine must produce significant knock before corrective action is taken to stop it by retarding the spark, which slows down the rate of combustion and prevents the triggering of knock. Hence, low levels of knock intensity are not detected by this method.

Alternatively, cylinder pressure has been used to detect knock by directly detecting the oscillations in the cylinder pressure. Similar to the production method, the energy of the oscillations is used as an index of the knock intensity. This method has the advantage over the block vibration method in that it can detect low levels of knock intensity to provide earlier detection. However, the knock intensity measured for a single combustion event is affected by the location of the sensor in the combustion chamber, and by vibrations in the block from the valve train or other mechanical components. Thus, there is a need for more robust methods of detecting knock as will be described below.

SUMMARY

The present disclosure accurately determines auto-ignition and reduces knock associated with auto-ignition in a manner that reduces misdetection.

In one aspect of the disclosure, a method includes generating a cylinder pressure signal, generating a heat release rate signal based on the cylinder pressure signal, determining a maximum heat release rate from the heat release rate signal and correcting auto-ignition for the engine based on the maximum heat release rate.

In another aspect of the disclosure, a method includes generating in-cylinder pressure signals for each cylinder of an internal combustion engine, processing the in-cylinder pressure signals with a filter to form filtered in-cylinder pressure signals, generating heat release rate signals based on the filtered in-cylinder pressure signals, establishing a window, determining a maximum heat release rate from the heat release rate signal within the window for each cylinder, generating intensity indexes for each cylinder, determining a maximum intensity index from the intensity indexes and when the maximum index is greater than a threshold then correcting an operating condition of the engine for auto-ignition.

In yet another aspect of the disclosure, a control module includes a filter module processing in-cylinder pressure signals using a filter to form filtered in-cylinder pressure signals. The control module further includes a heat release rate determination module generating heat release rate signals based on the in-cylinder pressure signals and a maximum heat rate determination module determining a maximum heat release rate from the heat release rate signals. The system also includes a correction module correcting auto-ignition for the engine based on the maximum heat release rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
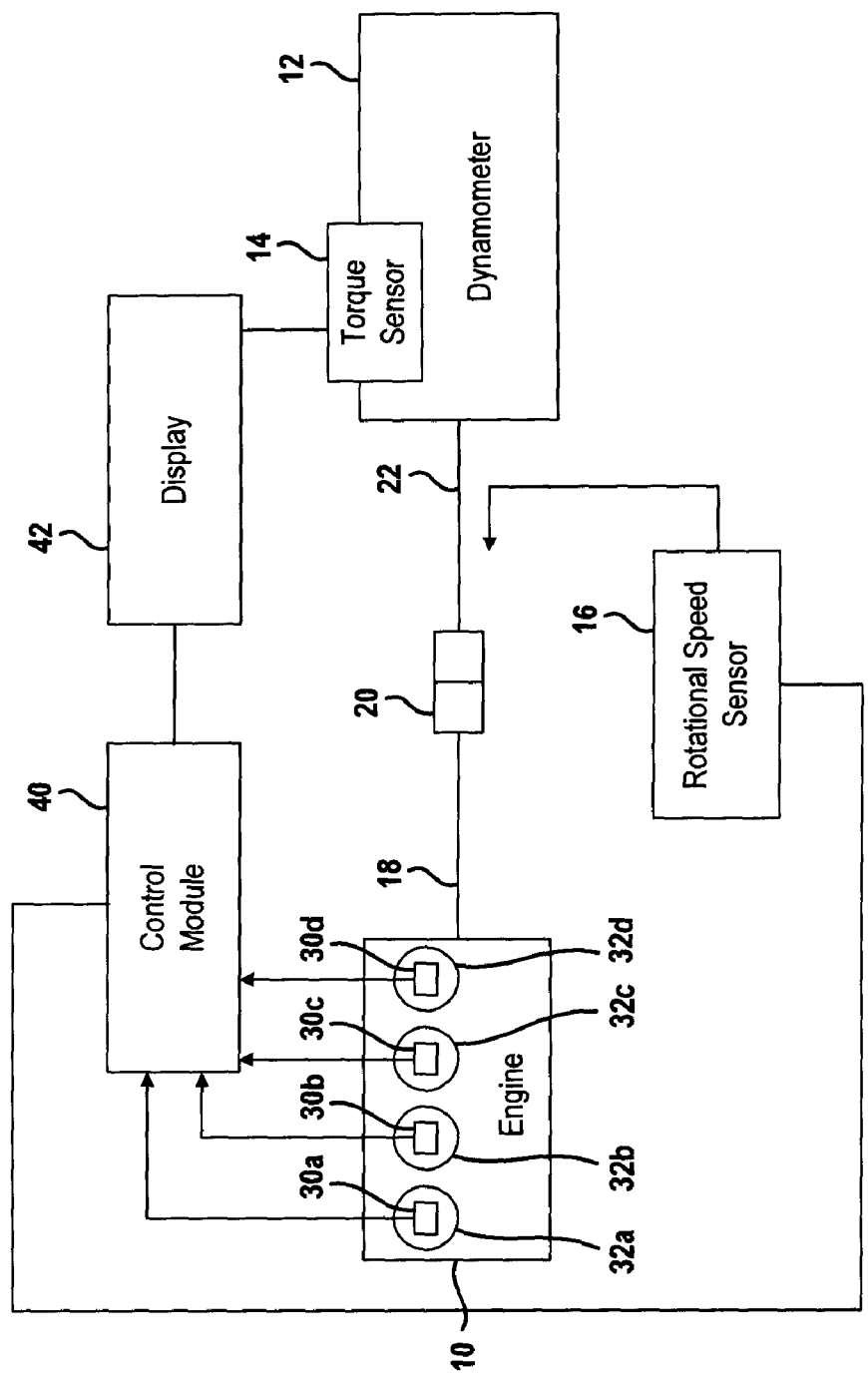
FIG. 1 is a block diagrammatic view of the control system of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine 10 is illustrated in communication with a dynamometer 12. The dynamometer is used for determining the torque of the engine 10 using a torque sensor 14. Various types of sensors may be used including a load cell or scale.

A rotational speed sensor 16 may also be associated with the dynamometer. The rotational speed sensor 16 may also be associated with the engine 10. The rotational speed sensor 16 is coupled directly to or indirectly to the engine crankshaft 18. A coupler 20 couples the engine crankshaft 18 to a dynamometer shaft 22.

The engine 10 may include in-cylinder pressure sensors 30a, 30b, 30c and 30d. Each of the cylinders 32a-32d has a respective in-cylinder pressure sensor. Each in-cylinder pressure sensor 30a-30d generates an in-cylinder pressure signal that is communicated to a control module 40. The control module 40 may be an engine control module, or a dynamometer control module. The control module 40 may also be a combination of the two. Should the engine be standalone, the control module 40 would be an engine control module. The control module 40 may also receive a torque signal from the torque sensor 14 and a rotational speed signal from the rotational speed sensor 16.

A display 42 is in communication with control module 40. The display 42 may convey various kinds of information to a dynamometer operator or to a vehicle operator. The display 42 may display various kinds of information such as the heat release rate and that auto-ignition or spark knock is to be mitigated.

Figure 2:
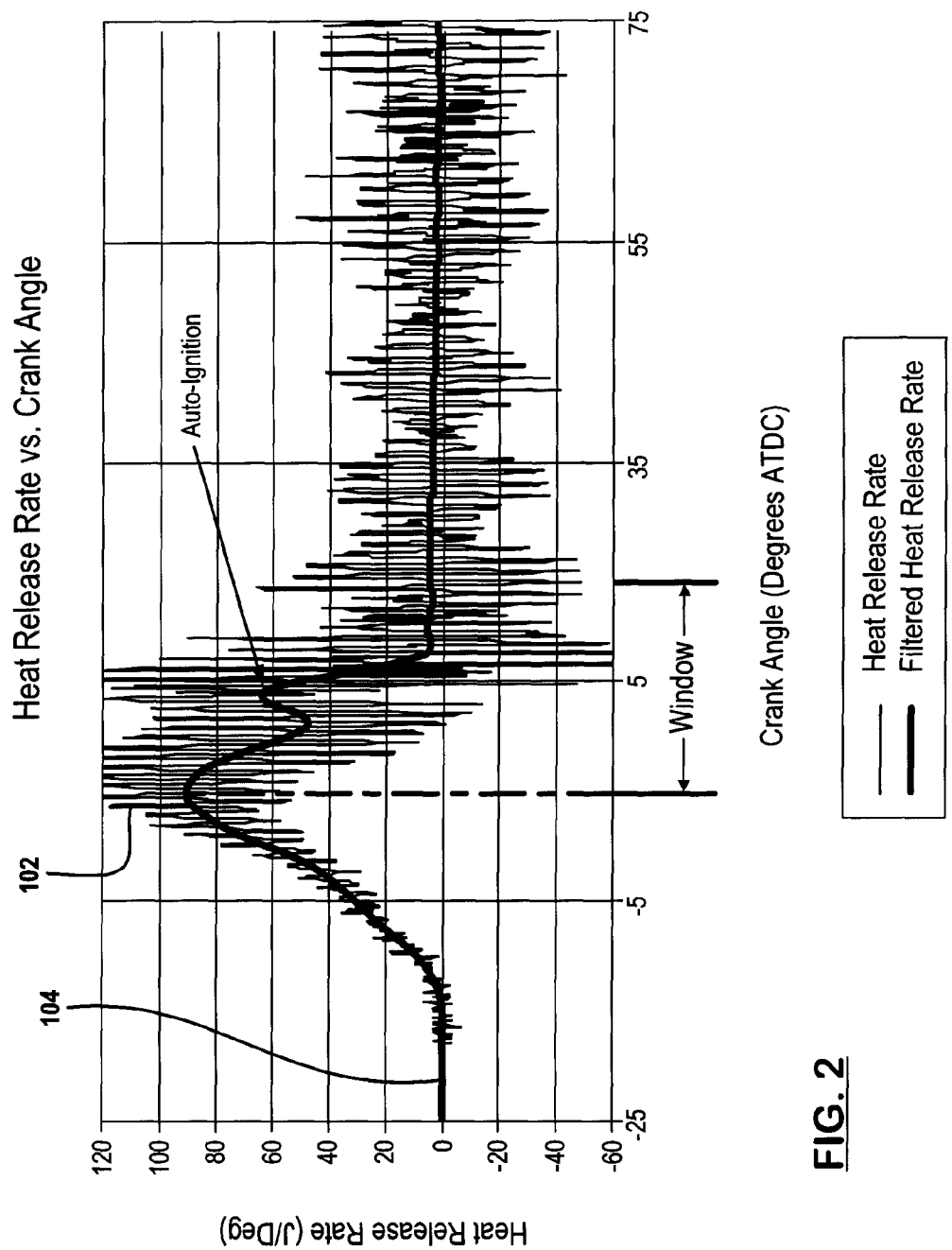
FIG. 2 is a plot of the heat release rate versus the crank angle for a particular cylinder of the engine

Referring now to FIG. 2, a plot of heat release rate versus crankshaft angle is illustrated. The present disclosure provides an alternative approach to estimating the strength of knock which may also be referred to as auto-ignition. Auto-ignition is an early indication and more sensitive measure of knock; because, auto-ignition is the cause that precedes and triggers an effect called knock. However, at low levels of auto-ignition, there is no knock; because, the auto-ignition energy released is not sufficient to trigger the sustained oscillations of knock. Thus, auto-ignition is a not only an early indicator of knock it is also a precursor of impending knock and the conditions that are conducive to producing knock. The auto-ignition or spark knock may be calculated from the cylinder pressure information and the cylinder volume waveform as a function of the crank angle by standard thermodynamic analysis. The heat release rate waveform for a knocking cylinder may have two components, a lower frequency waveform that represents the burn and a higher frequency waveform that is related to the knock and the characteristic or natural frequencies of the chamber and measurement noise. The measurement noise is mainly composed of electrical noise in the form of sensor noise and instrumentation noise. Measurement noise may also consist of vibrations in the engine structure and passage vibrations which are resonant frequencies due to a short passage that connects the cylinder gases and pressure from a combustion chamber to a sensor mounted on the engine block, head or spark plug. The lower frequency waveform 104 (filtered heat release rate) captures the effects of the burn which includes auto-ignition. The auto-ignition component of the burn is labeled on the graph of FIG. 2 which is shown as a secondary small peak in the heat release rate waveform. The measurement of the lower frequency component of the burn is not dependent on the location or mounting of the sensor and the chamber and is less sensitive to noise. As will be described below, the heat release rate waveform is low pass filtered by a smoothing filter to eliminate the knock and measurement noise.

The high frequency waveform 102 and the low frequency waveform 104 are illustrated in FIG. 2. The knock and noise signals are clearly evidence as the superposition of a high frequency waveform added to the underlying lower frequency filtered heat release rate waveform 104. From the lower frequency waveform in this combustion event it is clear that after the peak in the heat release rate (HRR) curve, there is a second burn that causes a rapid increase in the heat rate. The second burn is the auto-ignition event and it precedes an initiation of a high frequency oscillation or knock event. Although there is a high frequency oscillation before the auto-ignition event, this high frequency waveform changes, after the auto-ignition event, into a modulated waveform which shows that there is a combination of several frequencies that produce a beat frequency or modulation riding on top of the high frequency waveform. The auto-ignition event may be described by a metric that characterizes the auto-ignition intensity. The auto-ignition intensity (AI) directly corresponds to knock intensity such that higher auto-ignition intensities correspond to higher knock intensities and vice versa. The AI may be described by several metrics including the peak rate of the HRR increase (rise) during the auto-ignition event, the peak rate of HRR decrease, or the auto-ignition energy which is the integral of the area of the auto-ignition component of the burn.

The search window which is described in detail below is also illustrated in FIG. 2.

Figure 3:
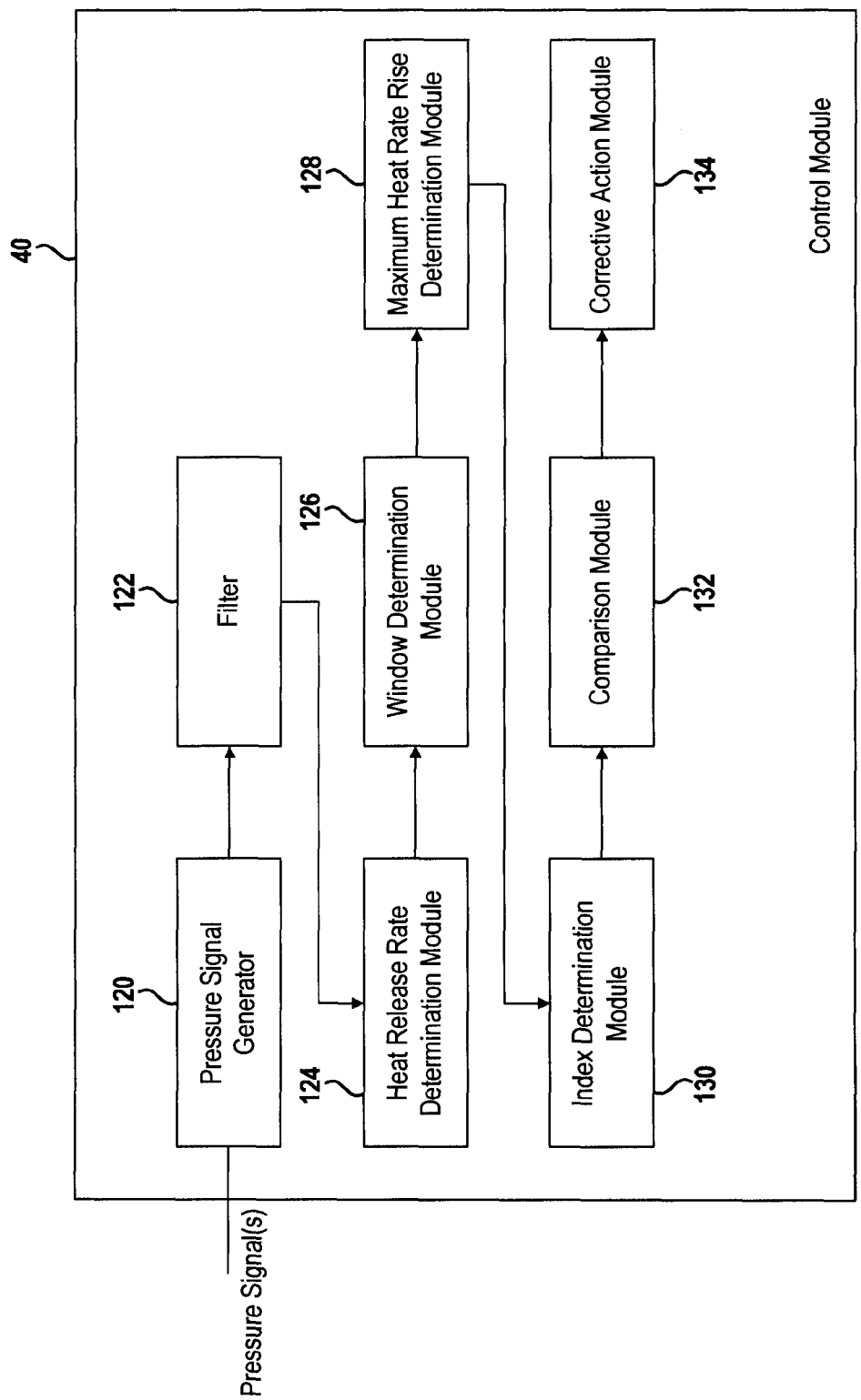
FIG. 3 is a block diagrammatic view of a control module according to the present disclosure.

Referring now to FIG. 3, the control module 40 of FIG. 1 is illustrated in further detail. The control module 40 may include a pressure signal generator 120. Each of the pressure sensors 30a-30d may be used to generate a pressure signal. The pressure signal generator 120 may receive the pressure signals from the pressure sensors and convert them into a form usable by the rest of the control module. As will be described below, each of the pressure signals from each of the cylinders may be used. By using the filtered heat release rate trace instead of the in-cylinder pressure trace, it is possible to avoid potential causes of misdetection of knock due to mechanical or passage resonances of the engine that also cause oscillations in the in-cylinder pressure traces.

In block 122 a filter is used to process the pressure signals from the pressure signal generator. Various types of filters may be used. For example, a single pass filter that adds phase shift may be used. Another type of filter is a forward-backward filter that adds no phase shift. A double-pass filter (filter in the forward direction first then filter in the backward direction) that adds no phase shift may also be used. The filtering process can add a delay or phase shift to the signal which depends on the order and type of the filter used. The filter's cut-off frequency is set to maintain a good level of auto-ignition detection while rejecting high frequency noise in the pressure signals due to mechanical or electrical sources. The corner frequency of the filter may be changed with engine speed to provide the best noise reduction to detect the auto-ignition.

In block 124, the heat release rate determination module determines the heat release rate using the filtered pressure signals from block 122. A differentiation of the pressure trace is used to determine the apparent heat release rate. Providing filtering in block 122 reduces the amount of noise amplification, which is normally produced by differentiation.

In block 126, a window determination module establishes a window interval in which the processing of the heat release rate is performed to determine the AI. The window may be a fixed calibratable length that is initiated at a predetermined event. The calculation of the window may use the crank angle of the location of the peak heat release rate or the first inflection point in the heat release rate curve (where there is a negative-to-positive zero crossing in the second derivative of the heat release rate curve and the first derivative of the heat release rate curve is positive, zero or nearly zero (i.e. it could be slightly negative, but close to zero)), whichever occurs first, to establish the start of the search window. As mentioned above, the search window may be of a calibrated length or may be ended due to an event, such as the level of the HRR dropping below a calibrated percentage of the peak value of HRR (such as 1-10%).

In block 128, a maximum heat rate rise determination module is provided within the control module 40. The maximum rise of heat release rate in the window is determined. This is equivalent to finding the peak of the heat release rate's first derivative in the window interval that was determined in block 126. The peak derivative of the heat release rate is used as a measure of the auto-ignition intensity. The formula used for the calculation of the apparent heat release rate (dQ/dTheta) at the current crank angle is:

$$dQ/d\text{Theta}=[1/(\text{gamma}-1)]*V*dP/d\text{Theta}+[\text{gamma}/(\text{gamma}-1)]*P*dV/d\text{Theta}$$

where: gamma=the specific heat ratio of cylinder mixture,
V=the volume of cylinder at current crank angle,
P=the in-cylinder pressure at the current crank angle, and
Theta=the crank angle.

In block 130 an index determination module is provided within the control module 40. The auto-ignition intensity determined in the maximum heat rate rise determination module may be passed through a moving average window. The moving average window is used to determine an auto-ignition intensity index that best balances and represents both the maximum intensity and frequency of auto-ignition events for a particular cylinder. Thus, auto-ignition by a single large energy event or by several smaller sequential events may result in the same corrective action. The severity of the auto-ignition/knock intensity index accounts/compensates for potential misdetection and filters out some possible noise of the signal. In block 132 a comparison module within the control module 40 compares and selects the maximum auto-ignition intensity index over all of the cylinders for a given engine cycle which is called an auto-ignition metric. The auto-ignition/knock metric is determined for the whole engine on a cycle-by-cycle basis. This final auto-ignition metric may be compared to a threshold to determine whether auto-ignition is severe enough to take corrective action. In block 134 a corrective action module may correct the operation of the engine to reduce auto-ignition or knock. Corrective action may take place by retarding the spark or other engine controls.

Figure 4:
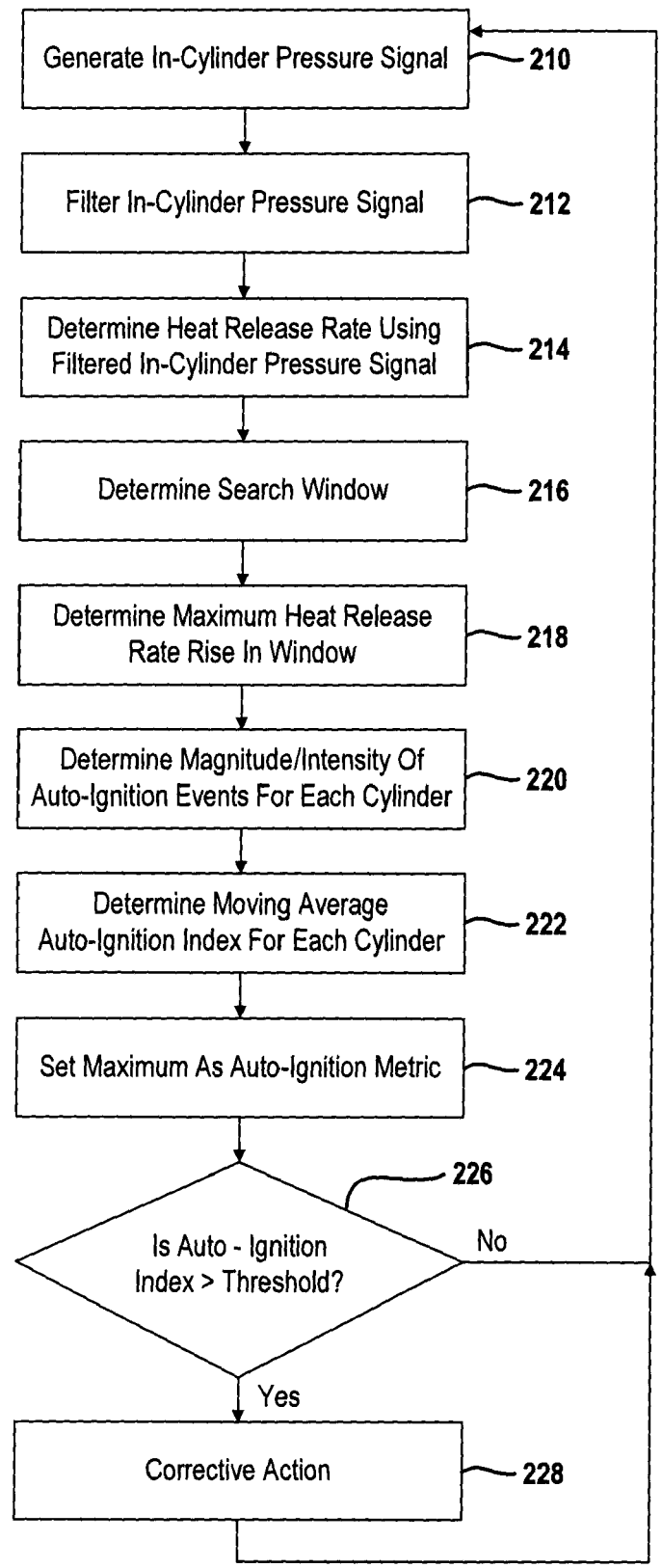
FIG. 4 is a flowchart of a method for performing corrective action based on an auto-ignition index according to the present disclosure.

Referring now to FIG. 4, a method for correcting for auto-ignition is set forth. In step 210, an in-cylinder pressure signal is generated. As mentioned above, each of the cylinders may have an in-cylinder pressure signal for determination of auto-ignition/knock. In step 212, the in-cylinder pressure signal may be filtered. As mentioned above, the filter may be various types of filters including a single-pass filter, a forward-backward filter and a double-pass filter. The filtering process may add a delay or phase shift to the signal which depends on the order and type of the filter used. The cut-off frequency of the filter is set to maintain a good level of auto-ignition detection while rejecting high frequency noise in the pressure signals due to mechanical or electrical sources. The corner filter may be changed with engine speed to provide noise reduction necessary to detect auto-ignition. In step 214, a heat release rate is determined using the filtered in-cylinder pressure signal. The formula for determining the heat release rate is provided above. In step 216, a search window for defining the section of the heat release trace used for the determination of auto-ignition is established. The window may be a function of the engine speed to adjust for variability during the combustion process. The calculation of the window may use the crank angle location of the peak heat release rate or the first inflection point in the heat release rate curve. This is a point where there is a negative-to-positive zero crossing in the second derivative of the heat release rate curve and the first derivative of the heat release rate curve is positive, zero or nearly zero (i.e. it could be slightly negative, but close to zero). This point may establish the start of the search window. The interval of the search window or window length may be calibrated based upon the engine speed or a percentage level of peak HRR.

In step 218 the maximum heat release rate rise that occurs within the window is determined. The peak of the heat release rate rise is used as a measure of the auto-ignition intensity. In step 220, the magnitude/intensity of the auto-ignition events is determined for each of the cylinders.

In step 222, the auto-ignition intensity of the individual cylinders may be passed through a moving average window filter. The moving average window filter may be used to determine an intensity index that best balances and represents both the magnitude and frequency of the auto-ignition events for a given cylinder. In step 224, the window averaged auto-ignition intensity indices for each of the cylinders are compared and the maximum over all of the cylinders for a given engine cycle is taken as the auto-ignition metric for the whole engine on a cycle-by-cycle basis. In step 226, if the auto-ignition metric is not greater than a threshold, step 210 is performed again at the next cylinder firing. In step 226, if the auto-ignition metric is greater than a threshold; then, step 228 performs a corrective action. The corrective action may vary the spark of the engine. In particular, the corrective action may retard the spark. Then, the process starts over again at the next cylinder firing in step 210.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A method comprising:
generating a cylinder pressure signal;
filtering the cylinder pressure signal with a filter to form a filtered cylinder pressure signal;

generating a heat release rate signal based on the filtered cylinder pressure signal;
determining a maximum heat release rate from the heat release rate signal; and
correcting auto-ignition for an engine based on the maximum heat release rate.

2. A method as recited in claim 1 wherein generating a cylinder pressure signal comprises generating an in-cylinder pressure signal.

3. A method as recited in claim 1 wherein generating a heat release rate signal comprises generating a heat release rate signal based on a cylinder volume.

4. A method as recited in claim 1 further comprising adjusting a corner frequency of the filter based on an engine speed.

5. A method as recited in claim 1 wherein determining a maximum heat release rate from the heat release rate signal comprises establishing a crank angle window and determining the maximum heat release rate from the heat release rate signal within the crank angle window.

6. A method as recited in claim 5 wherein establishing a crank angle window comprises establishing the crank angle window as a function of engine speed and wherein determining the maximum heat release rate comprises determining the maximum heat release rate from the heat release rate signal within the crank angle window.

7. A method as recited in claim 5 wherein establishing a crank angle window comprises establishing the crank angle window having a starting point as a function of one of a crankshaft angle of a peak heat release rate location and an inflection point in the heat release rate signal.

8. A method as recited in claim 1 further comprising determining an intensity index using a moving average of the maximum heat release rate and wherein correcting auto-ignition for the engine comprises correcting auto-ignition for the engine based on the intensity index.

9. A method as recited in claim 1 wherein determining a maximum heat release rate comprises determining a maximum heat release rate rise.

10. A method comprising:
generating in-cylinder pressure signals for each cylinder of an internal combustion engine;
filtering the in-cylinder pressure signals with a filter to form filtered in-cylinder pressure signals;
generating heat release rate signals based on the filtered in-cylinder pressure signals;
establishing a window;
determining a maximum heat release rate signal from the heat release rate signals within the window for each cylinder;
generating intensity indexes for each cylinder;
determining a maximum intensity index from the intensity indexes; and
when the maximum intensity index is greater than a threshold, correcting an operating condition of the engine for auto-ignition.

11. A method as recited in claim 10 wherein generating a maximum heat release rate signal comprises generating a maximum heat release rate rise signal.

12. A method as recited in claim 10 wherein generating a maximum heat release rate signal comprises generating a maximum heat release rate decrease signal.

13. A control module comprising:
a filter module filtering in-cylinder pressure signals using a filter to form filtered in-cylinder pressure signals;
a heat release rate determination module generating heat release rate signals based on the in-cylinder pressure signals;
a maximum heat release rate determination module determining a maximum heat release rate from the heat release rate signals; and
a correction module correcting auto-ignition for an engine based on the maximum heat release rate.

14. A control module as recited in claim 13 wherein the heat release rate is based on a cylinder volume.

15. A control module as recited in claim 13 wherein the filter module adjusts a corner frequency of the filter based on an engine speed.

16. A control module as recited in claim 13 further comprising a crank angle window determination module establishing a crank angle window and wherein the maximum heat release rate determination module determines the maximum heat release rate from the heat release rate signals within the crank angle window.

17. A control module as recited in claim 13 further comprising a crank angle window determination module establishing a crank angle window as a function of engine speed.

18. A control module as recited in claim 13 further comprising a crank angle window determination module establishing a crank angle window having a starting point as a function of crankshaft angle of a peak heat release rate location or an inflection point in the heat release rate signal.

19. A control module as recited in claim 13 further comprising an index determination module determining an intensity index using a moving average of the maximum heat release rate, a comparison module comparing the intensity index to a threshold and wherein the correction module corrects auto-ignition for the engine based on comparing.

* * * * *